UNITED STATES PATENT OFFICE.

LUDWIG OTTO HELMERS, OF HAMBURG, GERMANY, ASSIGNOR TO ICHTHYOL GESELLSCHAFT, CORDES, HERMANNI & CO., OF SAME PLACE.

IODIN DERIVATIVE OF ICHTHYOL AND THIOL.

SPECIFICATION forming part of Letters Patent No. 602,942, dated April 26, 1898.

Application filed September 10, 1897. Serial No. 651,244. (No specimens.) Patented in Germany June 3, 1893, Nos. 76,133 and 80,260; in France October 26, 1893, No. 233,662; in England October 26, 1893, No. 20,245; in Belgium October 26, 1893, No. 106,919; in Italy December 31, 1893, No. 35,098, and in Austria-Hungary March 17, 1895, No. 56,910 and No. 83,153.

*To all whom it may concern:*

Be it known that I, LUDWIG OTTO HELMERS, a subject of the German Emperor, residing at Hamburg, in the German Empire, have invented a certain new and useful Process of Obtaining Aqueous Solutions of Iodin, (for which I have obtained Letters Patent in Great Britain, dated October 26, 1893, No. 20,245; in Belgium, dated October 26, 1893, No. 106,919; in Austria-Hungary, dated March 17, 1895, No. 56,910 and No. 83,153; in Italy, dated December 31, 1893, No. 35,098; in France, dated October 26, 1893, No. 233,662, and in Germany Nos. 76,133 and 80,260, both dated June 3, 1893,) of which the following is a specification.

In the specification of my Letters Patent of the United States No. 525,784, dated September 11, 1894, I have described the purification of sulfonized-carbon compounds obtained by the action of sulfuric acid or its substitutes on hydrocarbons and the separation of said sulfonized-carbon compounds into sulfonic-acid salts *per se* soluble in water and into sulfone-like bodies *per se* insoluble in water. Among the sulfonized-carbon compounds mentioned in the said Letters Patent are those of special importance which are obtained by treating sulfureted hydrocarbons (containing at least five per cent. sulfur) with sulfuric acid or its substitutes and which are known under the name of "ichthyol" and "thiol." As I have already stated in the above-mentioned Letters Patent, these substances are compositions of different bodies, and if they are treated according to the method described in the said Letters Patent two bodies are obtained, one of which, called in the said Letters Patent "sulfone-like" body, is insoluble in water as well as in alcohol, but soluble in benzene. The other, called "sulfonic-acid" compound, is not only soluble in water, as the ichthyol or thiol, but also—and this is the very difference between it and ichthyol and thiol—completely soluble in alcohol. It is, however, nearly insoluble in ether or benzene. The manufacture of these two bodies from ichthyol and their respective properties I have fully described by an example in the above-mentioned Letters Patent No. 525,784. Of these two bodies the sulfonic-acid compound possesses an eminent importance by the combinations which it forms with certain bodies insoluble in water. As already stated in my said Letters Patent No. 525,784, the sulfone-like body of ichthyol, though entirely insoluble in water, becomes readily soluble in water when combined with the sulfonic-acid compound of ichthyol, and it is this complete solubility that makes the ichthyol so often used as a therapeutic means.

Experimental attempts have now been made to clear up the question whether other bodies insoluble in water which are distinguished by their therapeutic properties could be combined with the sulfonic-acid compound of ichthyol or thiol in such a manner that a combination completely soluble in water is obtained. Among other substances I turned my mind to iodin, so often used in therapeutics, and I succeeded to obtain a combination completely soluble in water, consisting of iodin and the sulfonic-acid compound of ichthyol. This combination is obtained by heating iodin and the sulfonic-acid compound with a small quantity of water, best in a closed vessel, or by dissolving the two bodies separately in a suitable solvent, as alcohol, then mixing them and distilling off the solvent afterward. In this manner I succeeded to combine nine parts of the sulfonic-acid compound with one part and more of iodin. The so-obtained combination is a viscid green product of an agreeable scent. It is clearly soluble in water in all proportions without the smallest separation of iodin.

Having now fully described my invention, what I claim, and desire to secure by Letters Patent, is—

1. The process of rendering iodin soluble in water, which consists in reacting upon it with a sulfonic-acid compound of a sulfureted hydrocarbon that is soluble in water, such as may be derived from ichthyol or thiol, substantially as set forth.

2. The process of rendering soluble in water iodin by reacting upon it with a compound of a sulfureted hydrocarbon soluble in water consisting of sulfonic acid and sulfone-like constituents such as may be derived from ichthyol and thiol, substantially as described.

3. An iodin compound that is soluble in water, consisting essentially of iodin and a sulfonic-acid compound capable of rendering the iodin soluble in water, for the purpose set forth.

4. The compound consisting of iodin and sulfonic acid and sulfone-like constituents of a sulfureted hydrocarbon combined with sulfuric acid such as may be derived from ichthyol or thiol in such proportions as to render the said iodin soluble in water, substantially as set forth.

In testimony that I claim the foregoing as my invention I have signed my name, in presence of two witnesses, this 28th day of August, 1897.

LUDWIG OTTO HELMERS.

Witnesses:
ALEXANDER SHECHT,
E. H. MUMMENHOFF.